(12) United States Patent
Hosaka

(10) Patent No.: US 6,651,987 B1
(45) Date of Patent: Nov. 25, 2003

(54) SEAL FOR PREVENTING LEAKAGE OF FLUID FROM OPENING FORMED IN SIDE WALL OF WORK TANK OF WIRE CUT ELECTRIC DISCHARGE MACHINE

(75) Inventor: Akio Hosaka, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 84 days.

(21) Appl. No.: 09/686,818

(22) Filed: Oct. 12, 2000

(30) Foreign Application Priority Data

Oct. 12, 1999 (JP) .......................................... 11-290124

(51) Int. Cl.$^7$ ................................ F16J 9/00; F16J 3/00
(52) U.S. Cl. ........................ 277/435; 277/634; 277/906
(58) Field of Search .......................... 219/69.12, 69.14; 277/345, 631, 634, 637, 628, 630, 906, 921

(56) References Cited

U.S. PATENT DOCUMENTS

| | | | | |
|---|---|---|---|---|
| 3,095,619 A | * | 7/1963 | Peterson | 277/316 |
| 4,426,816 A | * | 1/1984 | Dean et al. | 52/202 |
| 4,565,915 A | | 1/1986 | Girardin | |
| 4,647,747 A | | 3/1987 | Goto | |
| 4,808,786 A | * | 2/1989 | Shinkai et al. | 219/69.12 |
| 4,918,279 A | * | 4/1990 | Babel et al. | 219/69.12 |
| 5,003,746 A | * | 4/1991 | Wilston | 52/592.1 |
| 5,028,757 A | * | 7/1991 | Aramaki et al. | 219/69.12 |
| 5,171,955 A | * | 12/1992 | Hosaka et al. | 219/69.12 |
| 5,337,527 A | * | 8/1994 | Wagenaar | 405/284 |
| 5,780,801 A | * | 7/1998 | Maidagan | 219/69.12 |
| 6,209,284 B1 | * | 4/2001 | Porter | 52/794.1 |
| 6,429,395 B1 | * | 8/2002 | Wei | 219/69.12 |

FOREIGN PATENT DOCUMENTS

| | | | |
|---|---|---|---|
| EP | 0667202 A1 | * | 8/1995 |
| JP | 4201017 A | * | 7/1992 |
| JP | 2651746 | | 5/1997 |

* cited by examiner

*Primary Examiner*—Anthony Knight
*Assistant Examiner*—Vishal Patel
(74) *Attorney, Agent, or Firm*—McDermott, Will & Emery; Paul Devinsky

(57) ABSTRACT

A seal for preventing leakage of fluid from an opening (42) formed in a side wall (41) of a work tank (40) of a wire electric discharge machine comprises a slide plate (1) movable with respect to the work tank for closing the opening, and a rail member (22) attached to the work tank for guiding movements of the slide plate. The slide plate gas a waterproof thin flexible strip (13) and a number of rigid blocks (11, 12) attached to the flexible strip and arranged in a row so as to engage with each other at the edges. The rigid block gas a convex edge (111) and a concave edge (112) complementary to the convex edge. A method of forming the seal is also disclosed.

9 Claims, 7 Drawing Sheets

SEAL FOR PREVENTING LEAKAGE OF FLUID FROM OPENING FORMED IN SIDE WALL OF WORK TANK OF WIRE CUT ELECTRIC DISCHARGE MACHINE

FIELD OF THE INVENTION

The present invention relates to a wire cut electric discharge machine for machining a workpiece by causing electric discharge between a wire electrode, traveling between a pair of wire guides, and a workpiece immersed in dielectric fluid. In particular, the present invention relates to a wire cut electric discharge machine having an opening formed in a side wall of a work tank filled with dielectric fluid, one of the wire guides being attached to an arm extending through the opening. More particularly, the present invention relates to a seal for preventing leakage of dielectric fluid from the opening formed in the side wall of the work tank.

BACKGROUND OF THE INVENTION

With many wire electric discharge machines, the wire electrode travels vertically between a pair of wire guides, and one of either the pair of wire guides or the workpiece moves in a horizontal X—Y plane relative to the other. The workpiece is fixed to a work stand provided inside the work tank. The lower wire guide is attached to an end of an arm at a position lower than the workpiece. The arm extends through the opening formed in the side wall of the work tank.

As shown in FIG. 13, wire electric discharge machines having seals designed to prevent dielectric fluid leaking from an opening in a side wall of a work tank are already known. A work tank 40 is attached to a table 30. The table 30 is provided on a saddle 20, and is moveable in a Y axis direction. The saddle 20 is provided on a bed 10 and is moveable in the X axis direction, orthogonal to the Y axis. A workpiece WP is fixed to a work stand (not shown in the drawing) provided inside the work tank 40. A head 60 is attached to a column 50 positioned behind the work tank 40. A taper-cut unit 70 may be attached to the head 60, and an upper arm 80 is attached to the taper-cut unit 70. An upper guide assembly 81 having an upper wire guide is attached to a tip of the upper arm 80. A lower guide assembly 91 having a lower wire guide is attached to one end of the lower arm 90. A wire electrode EL bridges between upper and lower guide assemblies 81 and 91 perpendicular to the X axis and the Y axis. The upper guide assembly 81 is capable of moving in a horizontal U axis direction parallel to the X axis, and in a horizontal V axis direction parallel to the Y axis by the taper cut unit 70, so that the wire electrode EL may be tilted. A lower arm 90 extends outside of the work tank 40, and the other end of the lower arm 90 is fixed to the column 50. An opening 42, through which the lower arm 90 passes is formed in a side wall 41 of the work tank 40. The opening 42 extends in the X axis direction so that the work tank 40 can move in the X axis direction relative to the lower arm 90. In order to prevent leakage of dielectric fluid, a rigid slide plate 43 closing off the opening 42 is provided outside the work tank 40. A hole through which the lower arm 90 passes is formed in the slide plate 43. This hole has only a slightly larger diameter than the lower arm 90. An O-ring is provided in the small gap between the slide plate 43 and the lower arm 90. A resilient seal made of rubber or flexible plastic is provided between the slide plate 43 and the side wall 41. The slide plate 43 must have a length of twice the distance the work tank moves in the X axis direction, which causes the surface area for installation of the machine to be large. U.S. Pat. No. 4,647,747 discloses use of a closure strip made of a flexible material in place of the slide plate 43 of FIG. 13. In order to make the machine compact, both ends of this closure strip are wound using a reel. Japanese Patent No. 2651746 discloses a flexible closure strip that can be bent at corners of the side wall of the work tank, and a support member for supporting the closure strip against the pressure of the dielectric fluid. This support member is formed of several rigid plates linked together using a chain, so that it can be bent with the closure strip.

SUMMARY OF THE INVENTION

An object of the invention is to provide a compact and light weight seal that effectively prevents leakage of dielectric fluid inside the work tank.

Another object of the present invention is to provide a seal that can be easily manufactured.

According to one aspect of the present invention, a seal for preventing leakage of fluid from an opening formed in a side wall of a work tank of a wire electric discharge machine comprises:

a slide plate movable with respect to the work tank for closing the opening, and a rail member attached to the work tank for guiding movements of the slide plate, the slide plate having a waterproof flexible strip and a number of rigid blocks which are attached to the waterproof flexible strip and arranged in a row so as to engage with each other at the edges.

It is preferable that the rigid block has a convex edge such as a wedge-shaped edge, and a concave edge complementary to the convex edge.

It is preferable that the rigid block has a front surface comprising a non-bonding surface 6nd a bonding surface adopted to be coated with adhesive, the bonding surface projecting from the non-bonding surface, and a hole passing from a rear surface to the bonding surface. The adhesive may be injected from the hole to the bonding surface.

According to another aspect of the present invention, a method of manufacturing a slide plate for closing an opening formed in a side wall of a work tank of a wire electric discharge machine, comprises the steps of:

providing a waterproof flexible strip;

providing a number of rigid blocks, each of which has an injecting hole passing from the rear surface to the front surface;

sticking double-sided adhesive tape to the waterproof flexible strip in a longitudinal direction;

sticking the rigid blocks in a row to the flexible strip using the double-sided adhesive tape so that the edges of the adjacent rigid blocks are fitted together; and injecting adhesive from the injecting hole to the front surface bounded by the double-sided adhesive tape to bond the rigid blocks to the waterproof flexible strip.

Additional objects, advantages and novel features of the invention will be set forth in the description that follows, and will in part become apparent to those skilled in the art upon reading this description or practicing the invention. The objects and advantages of the invention may be realized and attained by practicing the invention as recited in the appended claims.

PREFERRED EMBODIMENT OF THE INVENTION

Figure 13:
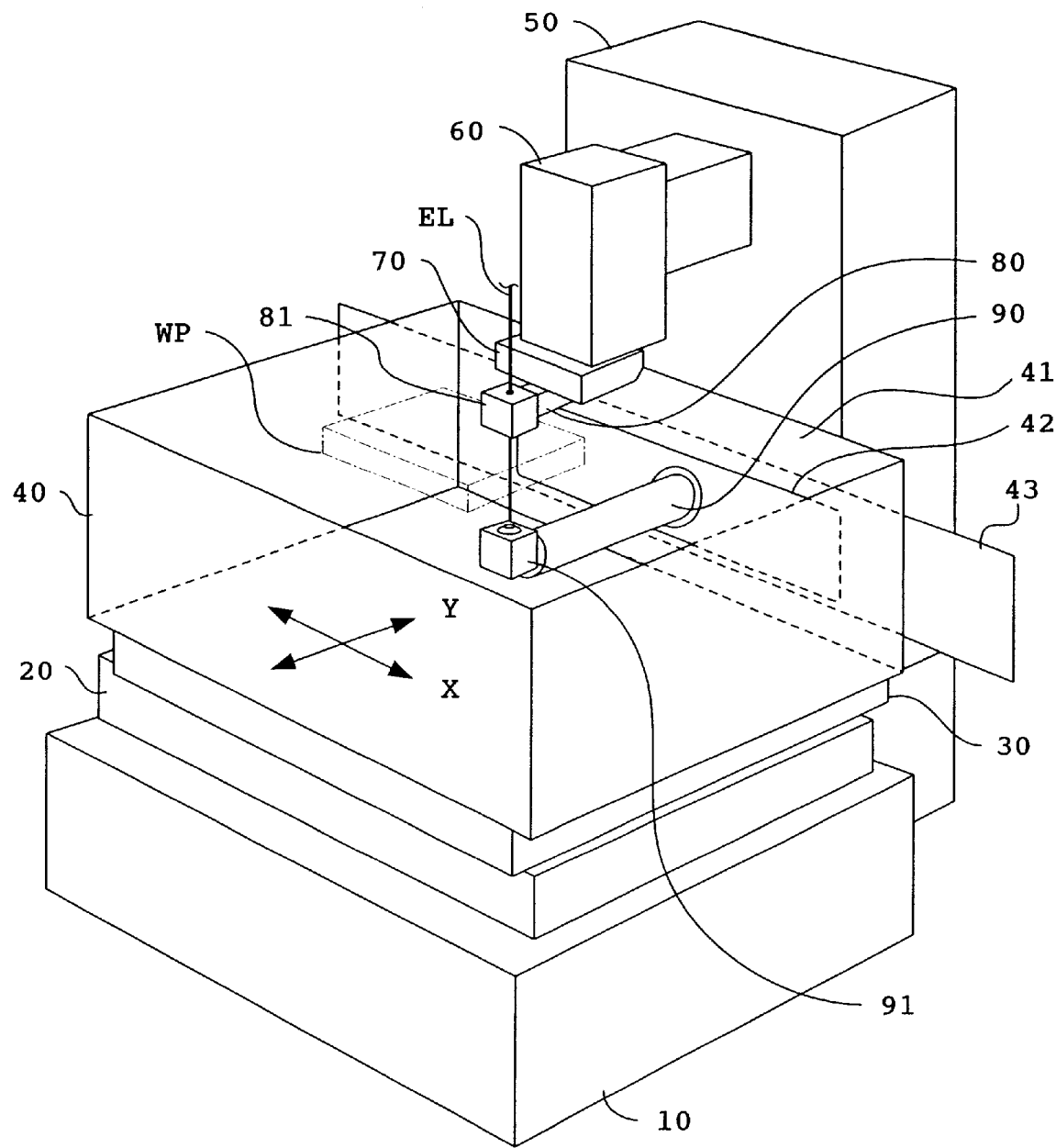
FIG. 13 is a perspective view showing a conventional seal for a wire electric discharge machine.

An exemplary seal for a wire electric discharge machine according to the present invention will now be described with reference to FIGS. 1–9. The same reference numerals as used in FIG. 13 will be used to refer to the same elements, and detailed description of these elements will be omitted.

Figure 1:
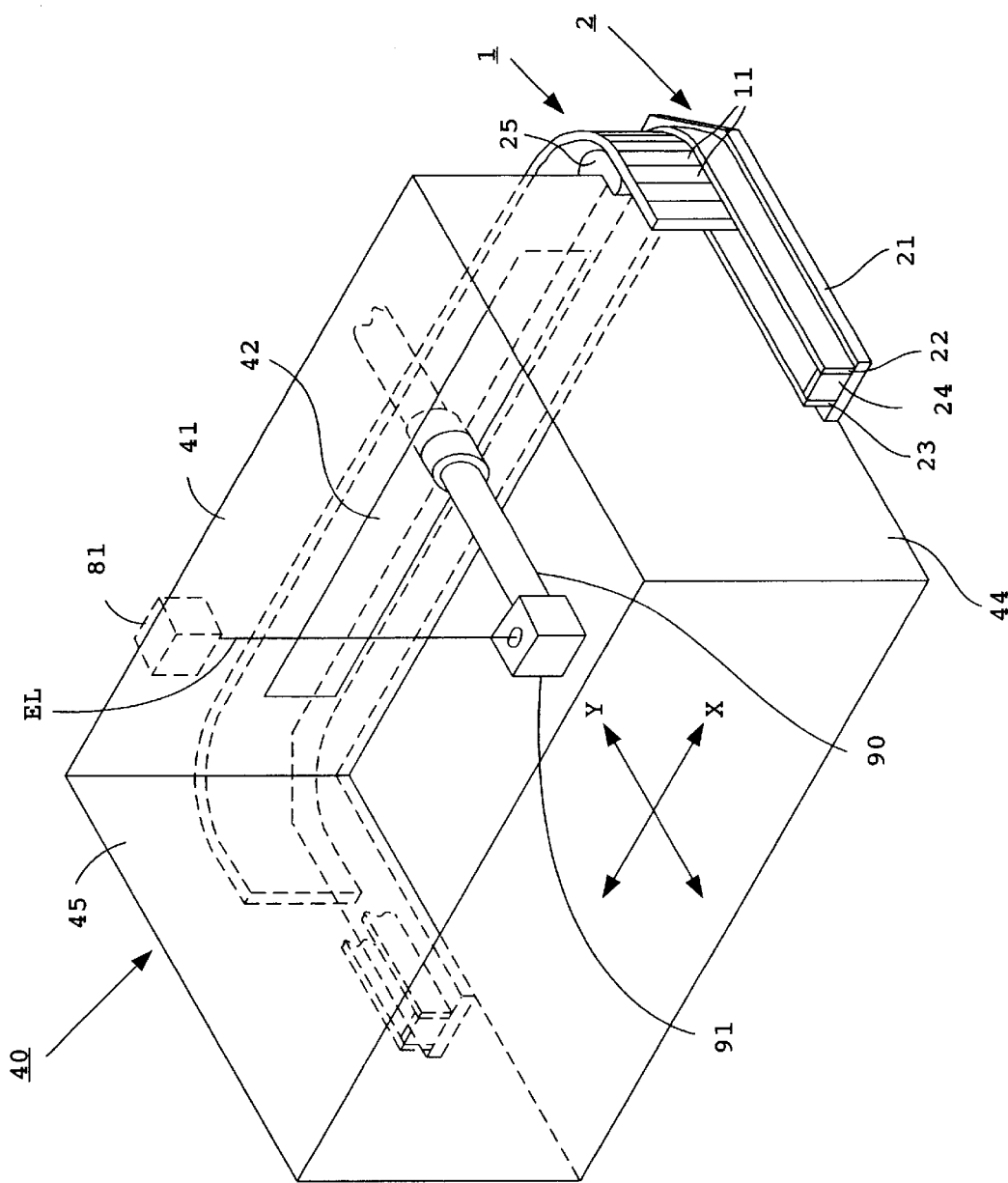
FIG. 1 is a perspective view showing a seal for a wire electric discharge machine of the present invention.
Figure 2:
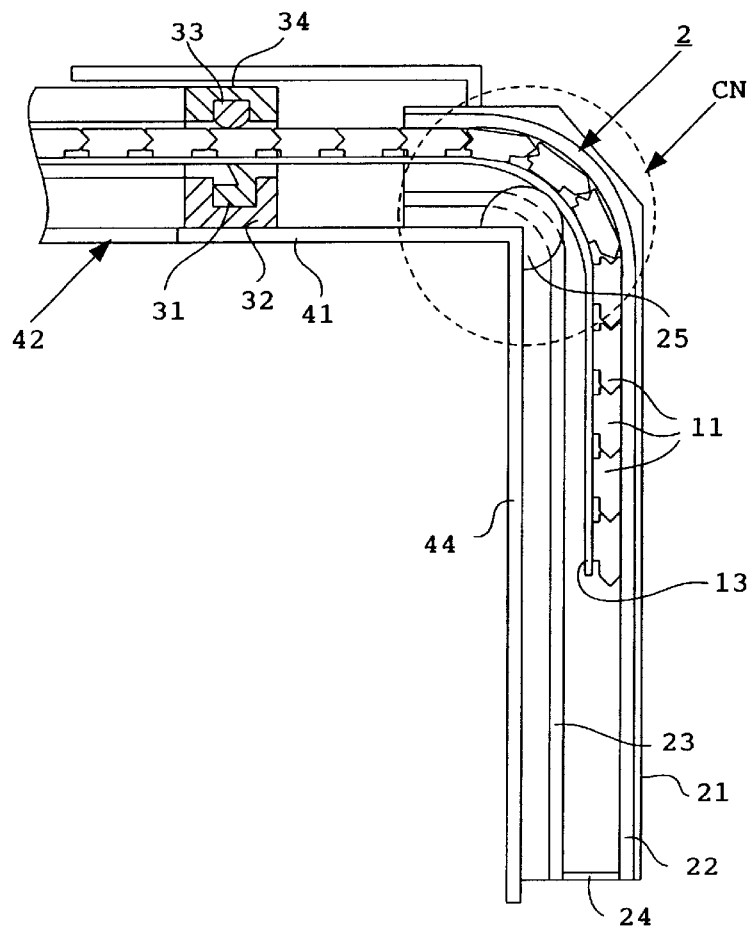
FIG. 2 is a plan view partially showing the seal of FIG. 1.
Figure 3:
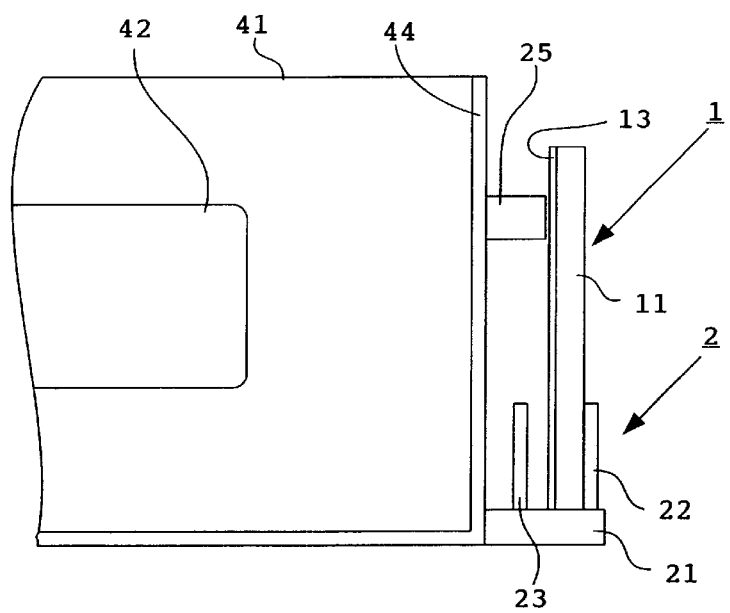
FIG. 3 is a side elevation partially showing the seal of FIG. 1.
Figure 4:
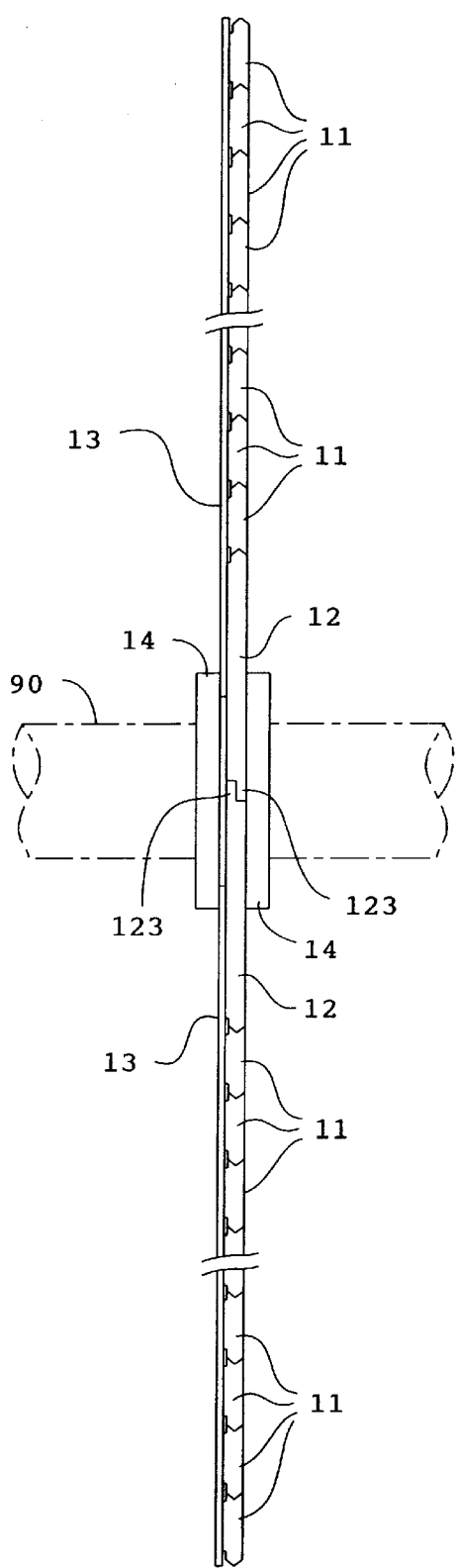
FIG. 4 is a plan view showing a slide plate of FIG. 1.
Figure 5:
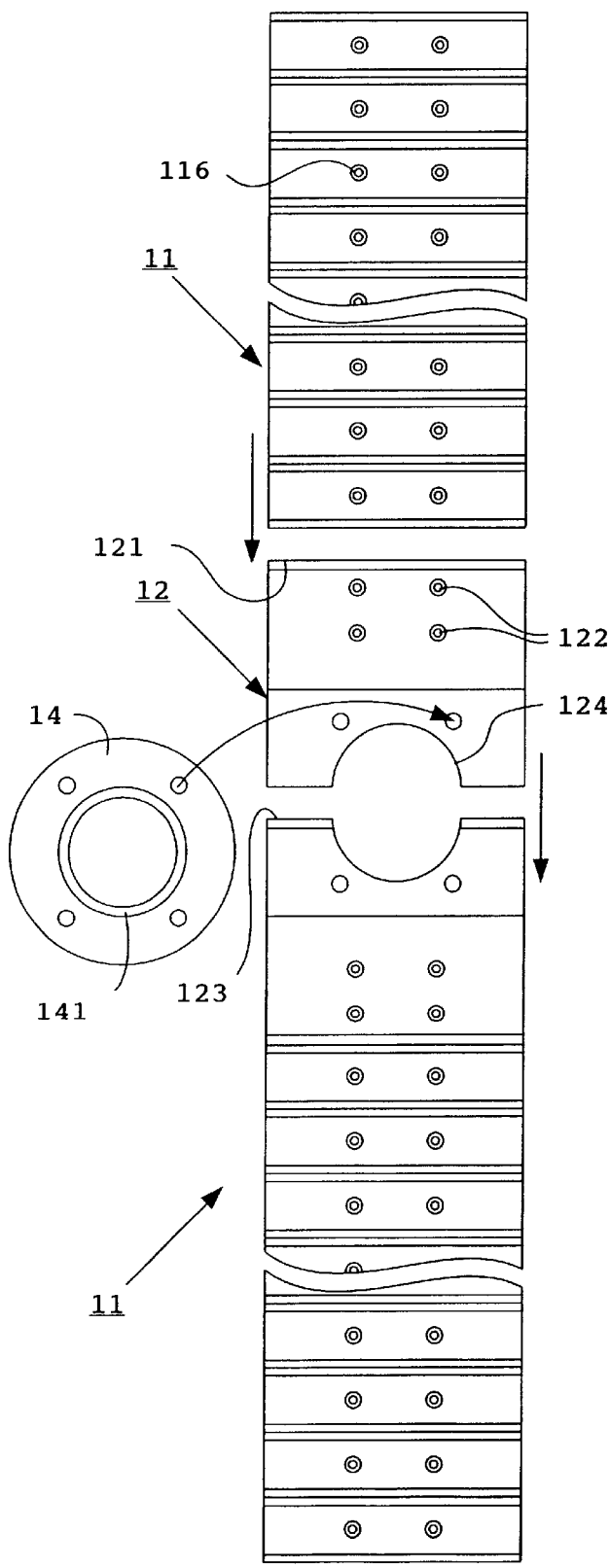
FIG. 5 is a side elevation showing the slide plate of FIG. 1.

As shown in FIG. 1, FIG. 2 and FIG. 3, the exemplary seal, mainly composed of a slide plate 1 closing off an opening 42, and a rail member 2 for guiding the slide plate 1 is provided. As shown in FIG. 4 and FIG. 5, the slide plate 1 includes a row of blocks 11, 12 and two waterproof flexible strips 13. The blocks 11, 12 are high rigidity blocks having a thickness of about 7 mm and are attached to the flexible strips 13. The flexible strips 13, having a thickness of about 1 mm, preferably do not protrude outside of the work tank 40. The blocks 11, 12 are preferably formed from light weight, abrasion proof resin, such as polycarbonate. As shown in FIG. 5, two blocks 12 arranged in the middle of the row of blocks have generally semicircular cut-aways 124 at their opposing edges. The two blocks 12 are joined at stepped bonding surfaces 123, and form a hole through which the lower arm 90 can pass. An annular member 14, fitted with an O-ring 141 for closing off a gap between this hole and the lower arm 90, is fixed to the two blocks 12. The annular member 14 functions to reinforce the joint between the two blocks 12 and to fix one end of each of the two flexible strips 13 to the blocks 12. Instead of the two blocks 12 it is possible, for example, to use a single block having a hole through which the lower arm 90 can pass. Other variations within the scope of the invention will suggest themselves to the artisan.

Figure 6:
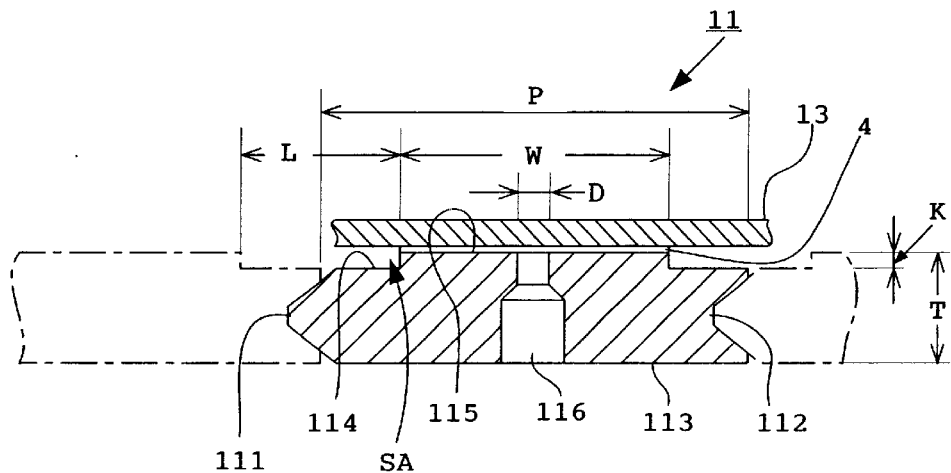
FIG. 6 is a cross section showing an example of a block of the slide plate of FIG. 1.
Figure 7:
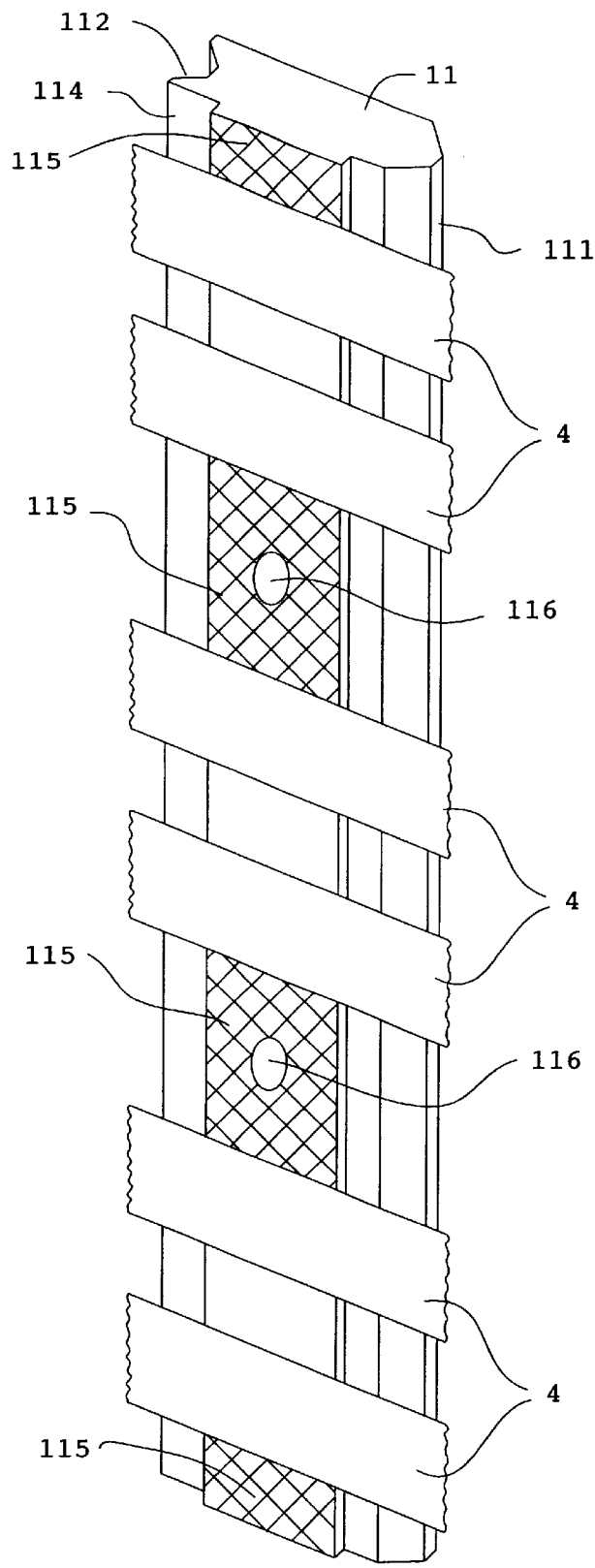
FIG. 7 is a perspective view showing the block of FIG. 6.
Figure 8:
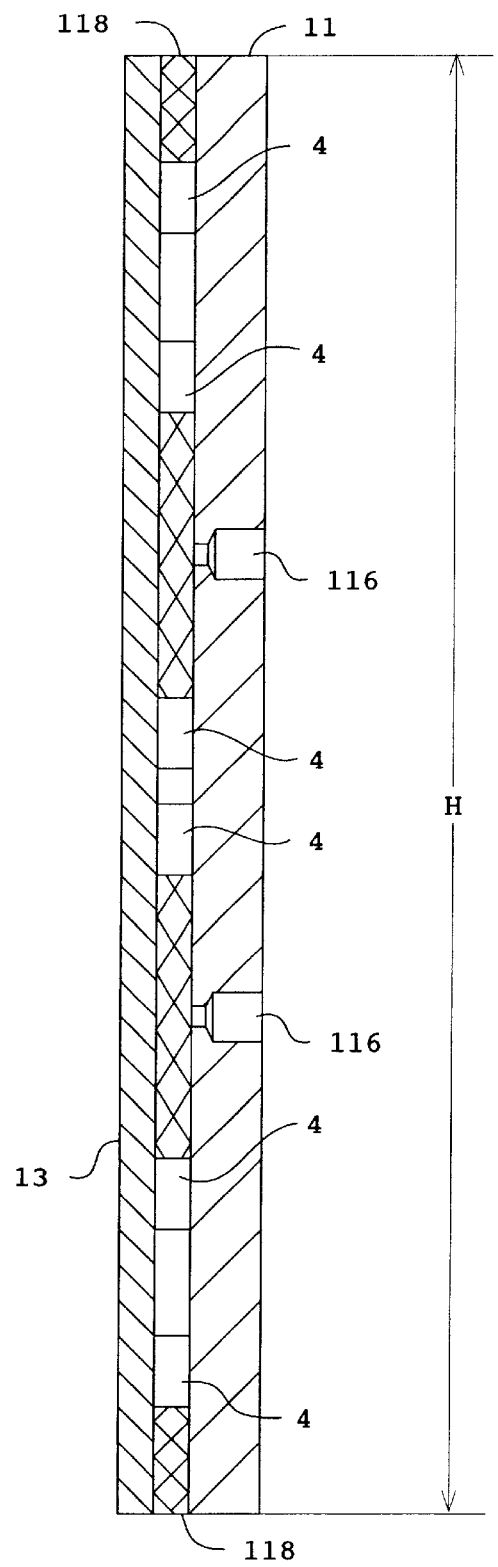
FIG. 8 is a cross section showing the block of FIG. 6.

One example of the blocks 11 will now be described with reference to FIG. 6, FIG. 7 and FIG. 8. The exemplary blocks 11 have a height H of about 172 mm, a pitch P of about 24 mm and a thickness T of about 7 mm. One edge 111,.of the block 11 preferably has a wedge shaped or semicircular convex cross section. The other edge 112 of the block 111 preferably has a concave cross section complementary to the shape of the edge 111. Thus, adjacent blocks 11 may engage with each other using the convex edge 111 and the concave edge 112, but are not fixed. The middle blocks 12 are also preferably provided with a similar convex shape so that a block 12 is engageable with an adjacent block 11. The front surface of the block 11 comprises of a bonding surface 115 having a width W for example of about 15 mm that will be coated with adhesive, and a non-bonding surface 114. Because the bonding surface 115 projects by a thickness K of about 1 mm more than the non-bonding surface 114, a space SA of length L, which in the illustrated example is about 9 mm, is formed by the adjacent blocks 11 and the flexible strip 13. Because of this space SA, when the slide plate 1 is bent at the corners of the work tank 40, no excessive force tending to prevent curvature acts on the flexible strip 13. The rear surface 113 of the block 11 is preferably smooth Two holes 116 are formed in the block 11, passing from the rear surface 113 to the bonding surface 115. In the illustrated example, the diameter D of the holes 116 is about 2 mm at the bonding surface side and larger at the rear surface side. Four holes 122, similar to the holes 116, are formed in the middle blocks 12. Adhesive for bonding the blocks 11, 12 to the flexible strips 13 may be injected via the holes 116, 122. As the blocks 11 are joined using the flexible strips 13 and the edges of the blocks 11, 12 are fitted together, the slide plate 1 may be maintained straight at straight sections. Though the edges of the blocks 11, 12 are fitted together, they are not fixed. Accordingly, the slide plate 1 is able to curve smoothly at curved sections as the edges of the adjacent blocks 11 slightly separate from each other.

The rail member 2 for guiding the slide plate 1 includes a bottom plate 21, side plates 22 and 23, and a termination plate 24, as shown in FIGS. 1, 2 and 3. The generally C-shaped bottom plate 21 is formed of a plurality of members strongly attached to side walls 44, 41 and 45 of the work tank 40, and the slide plate 1 slides on the bottom plate 21. The side plates 22 and 23 are attached to the bottom plate 21, and the slide plate 1 moves between the side plates 22 and 23. The side plates 22 and 23 extend almost parallel while describing an arc at the corners CN of the work tank 40. The termination plate 24 is attached to both ends of the bottom plate 21 so that the slide plate 1 does not pass the bottom plate 21. Substantially cylindrical guide members 25 are respectively provided at the corners CN of the work tank 40 so that the slide plate 1 can be curved smoothly round the corners CN along the outer side plate 22.

Figure 9:
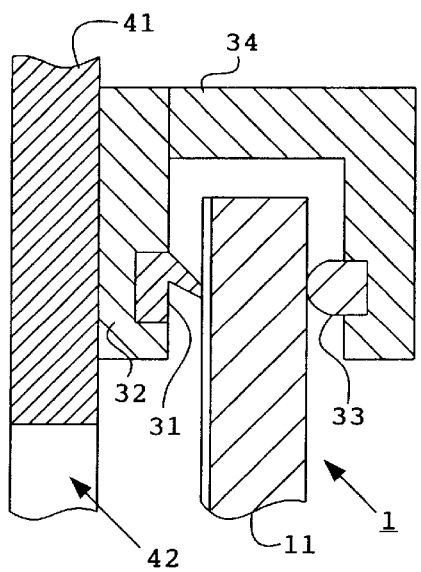
FIG. 9 is a cross section showing the block of FIG. 6 and the seal member.

As shown in FIG. 2 and FIG. 9, a frame 32 surrounding the opening 42 is fixed at the outer side of the work tank side wall 41. A seal member 31 is attached to the frame 32, and prevents leakage from a gap between the slide plate 1 and the side wall 41. The seal member 31 is preferably made of rubber or a flexible plastic material. A pressing part 33 attached to a frame 34 is positioned opposite to the frame 32 for pressing the slide plate 1 towards the. side wall 41.

A method of manufacturing the seal of the present invention will now be described with reference to FIGS. 6–8.

The method of making a seal according to the present invention includes a step of sticking double-sided adhesive tape 4, having a thickness of about 0.1 mm, to the two flexible strips 13 in a longitudinal direction. In the illustrated embodiment, as shown in FIG. 7, six double-sided adhesive tapes 4 are stuck to the flexible strips 13. Care must be taken to ensure that the double-sided adhesive tapes 4 stuck to the flexible strips 13 will not block off the holes 116 and 122, in the blocks 11 and 12 respectively, in subsequent steps. It is preferable that the double-sided adhesive tape 4 is additionally stuck to one end of the flexible strips 13 in a transverse direction so that adhesive does not leak from a gap formed between the middle blocks 12 and the flexible strips 13.

The manufacturing method also includes a step of temporarily sticking the blocks 11 and 12 to the flexible strips 13 using the double-sided adhesive tapes 4. The middle blocks 12 are joined using adhesive at respective stepped bonding surfaces 123. After the adhesive has set, one end of the flexible strips 13 is stuck to the middle blocks 12 using the double-sided adhesive tapes 4. The annular member 14 is fixed to the blocks 12 using screws. At this time, one end of each of the flexible strips 13 is caught between the respective middle block 12 and the annular member 14. As is clearly shown in FIG. 5, a block 11 is stuck to the flexible strip 13 using the double-sided adhesive tapes 4 so as to engage with the adjacent middle block 12. The remaining blocks 11 are stuck to the flexible strips 13 in a row one after the other so that the edges of the adjacent blocks 11 may be fitted together.

Once it is confirmed that the blocks 11 and 12 are correctly arranged at specified positions on the flexible strips 13, the manufacturing method proceeds to a step of bonding the blocks 11 and 12 to the flexible strips 13. A low viscosity solvent, for example, may be used as the adhesive. An appropriate amount of adhesive is injected via holes 122 into a gap formed between the middle blocks 12 and the flexible strips 13 to a thickness of about the same as the thickness of the double-sided adhesive tapes 4, using a suitable injector. Similarly, an appropriate amount of adhesive may be injected via holes 116 in the blocks 11 to the bonding surfaces 115 bounded on the top and bottom by the double-sided adhesive tapes 4. The bonding surfaces 115 only project by a thickness K of about 1 mm from the non-bonding surfaces 114, which means that the adhesive will not flow to the non-bonding surfaces 114. Additionally, adhesive may be injected from upper and lower ends 118 of the blocks 11 to the bonding surfaces 115. The amount of adhesive depends on the surface area of the bonding surfaces 115 bounded by the double-sided adhesive tapes 4, and the thickness of the double-sided adhesive tapes 4. In this way, adhesive may be coated on sections shown by the mesh lines in FIG. 7.

On the other hand, the bottom plate 21 is attached to the side walls 41, 44 and 45 of the work tank 40, and side plates 22 and 23 and the termination plate 24 is attached to the bottom plate 21. Also, the guide members 25 are attached to the bottom plate 21 at respective corners CN of the work tank 40. The frame 32 surrounding the opening 42 is fixed to the side wall 41. The initially produced slide plate 1 is arranged on the bottom plate 21 between the side plates 22 and 23. The frame 34 is temporarily attached to the frame 32. A guide hole through which the slide plate 1 passes is formed by the frames 32 and 34 and the bottom plate 21. After the slide plate 1 has been fit in this guide hole, the frame 34 is strongly fixed to the frame 32.

Figure 12:
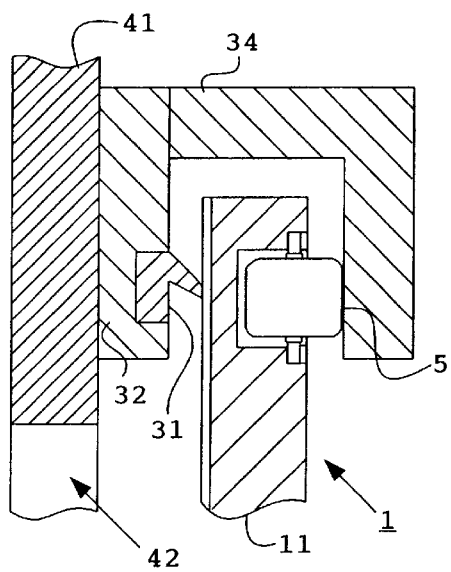
FIG. 12 is a cross section showing the block of FIG. 9 and the seal member.

Another example of the blocks 11 will now be described with reference to FIGS. 10, 11 and 12. The same reference numerals as are used in FIGS. 6, 7 and 9 will be attached to the same elements, and detailed description of these elements will be omitted.

Figure 10:
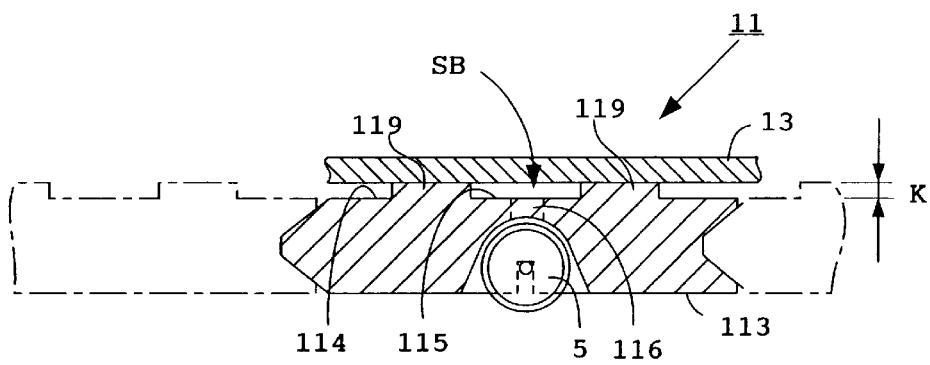
FIG. 10 is a cross section showing another example of a block of the slide plate of FIG. 1.
Figure 11:
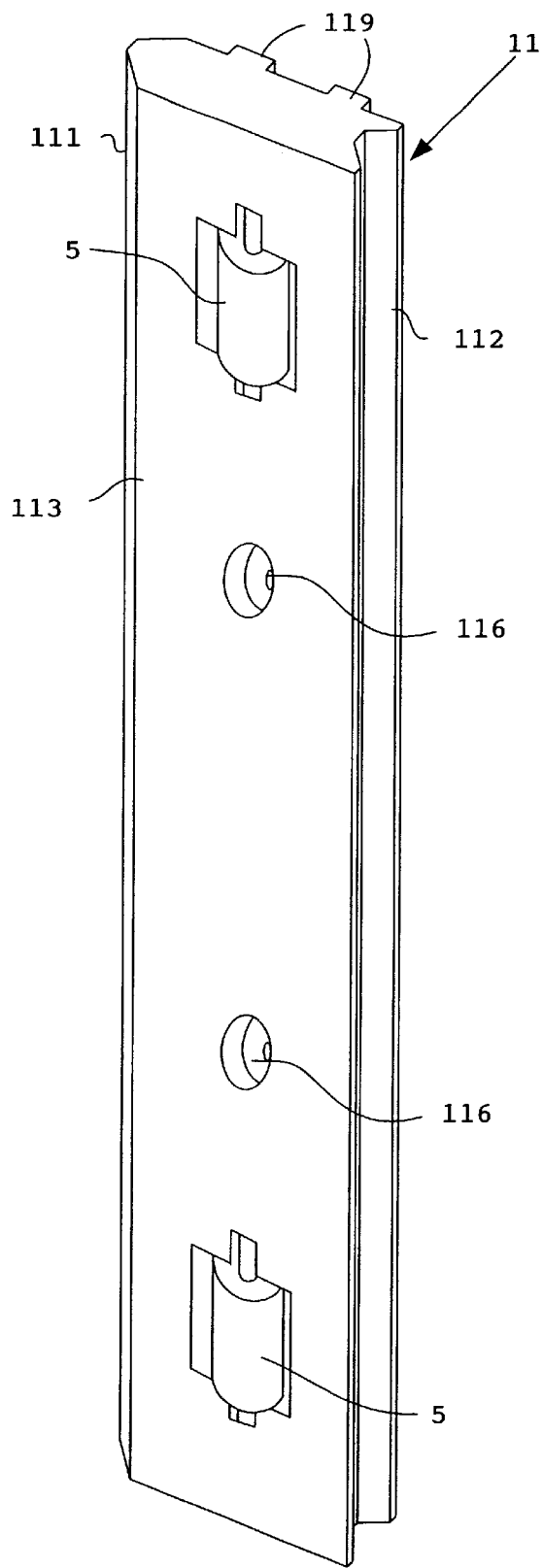
FIG. 11 is a perspective view showing the block of FIG. 9.

As clearly shown in FIG. 10, a space SB is formed by the flexible strip 13 and two projections 119 of the block 11. The height of the projections 119 is about 0.1 mm, approximately the same as the thickness of the double-sided adhesive tape 4. Use of the blocks 11 in this example makes it unnecessary to have a step of sticking the double-sided adhesive tapes 4 to the two flexible strips 13 when manufacturing the seal. The block 11 includes two rollers 5 on the rear surface 113 side at upper and lower ends of the block 11. The rollers 5 contribute to smooth sliding of the blocks 11 on the frame 34. The rollers 5 also function to press the slide plate 1 towards the side wall 41, in place of the pressing part 33 in FIG. 9.

The foregoing description of preferred embodiments of the invention have been presented for purposes of illustration and description. It is not intended to be exhaustive or to limit the invention to the precise form disclosed, and obviously many modifications and variations are possible in light of the above teaching. For example, instead of the two flexible strips 13, it is possible to use a single flexible strip having an opening through which the lower arm 90 passes. It is intended that the scope of the invention be defined by the claims appended hereto.

What is claimed is:

1. A seal for preventing leakage of fluid from an opening formed in a side wall of a work tank of a wire cut electric discharge machine, comprising:

a slide plate movable with respect to the work tank for closing the opening, and a rail member having a straight section and a curved section, attached to the work tank for guiding movement of the slide plate, wherein the slide plate includes a waterproof flexible strip and a plurality of rigid blocks attached to the waterproof flexible strip, said rigid blocks having first and second edges, and wherein opposing first and second edges of adjacent blocks are fitted together in the straight section and slightly separate from each other in the curved section, wherein the first edge is a convex edge and the second edge is a concave edge, complementary in shape to the first edge.

2. The seal for preventing leakage of fluid according to claim 1, wherein the rigid block has a rear surface and a front surface comprising of a non-bonding surface and a bonding surface projecting from the non-bonding surface, said bonding surface being adapted to be coated with adhesive, and a hole passing from the rear surface to the bonding surface.

3. The seal for preventing leakage of fluid according to claim 1, wherein the rigid block includes a roller on the rear surface for smooth movement of the rigid block.

4. A seal for preventing leakage of fluid from an opening formed in a side wall of a work tank of a wire cut electric discharge machine, comprising:

a slide plate movable with respect to the work tank for closing the opening, and a rail member having a straight section and a curved section, attached to the work tank for guiding movement of the slide plate, wherein the slide plate includes a waterproof flexible strip and a plurality of rigid blocks attached to the waterproof flexible strip, said rigid blocks having first and second edges, and wherein opposing first and second edges of adjacent blocks are fitted together in the straight section and slightly separate from each other in the curved section, wherein the first edge is a wedge-shaped edge and the second edge is a concave edge complementary in shape to the first edge.

5. The seal for preventing leakage of fluid according to claim 4, wherein the rigid block has a rear surface and a front surface comprising of a non-bonding surface and a bonding surface projecting from the non-bonding surface, said bonding surface being adapted to be coated with adhesive, and a hole passing from the rear surface to the bonding surface.

6. The seal for preventing leakage of fluid according to claim 4, wherein the rigid block includes a roller on the rear surface for smooth movement of the rigid block.

7. A seal for preventing leakage of fluid from an opening formed in a side wall of a work tank of a wire cut electric discharge machine, comprising:
- a slide plate movable with respect to the work tank for closing the opening, and
- a rail member having a straight section and a curved section, attached to the work tank for guiding movement of the slide plate,
- wherein the slide plate includes a waterproof flexible strip and a plurality of rigid blocks attached to the waterproof flexible strip by adhesive, said rigid block having a rear surface and a front surface comprising of a non-bonding surface and a bonding surface, and
- wherein the bonding surface projects from the non-bonding surface and is adapted to be coated with adhesive,
- wherein the rigid block has a hole passing from the rear surface to the bonding surface.

8. The seal for preventing leakage of fluid according to claim 7, wherein the rigid block includes a roller on the rear surface for smooth movement of the rigid block.

9. The seal for preventing leakage of fluid according to claim 7, wherein opposing edges of adjacent blocks are fitted together in the straight section.

* * * * *